(12) United States Patent
Lee et al.

(10) Patent No.: US 12,170,383 B2
(45) Date of Patent: Dec. 17, 2024

(54) SEPARATOR FOR ELECTROCHEMICAL DEVICE COMPRISING A PATTERNED ELECTRODE ADHESIVE LAYER AND A METHOD FOR MANUFACTURING THE SEPARATOR

(71) Applicant: LG Chem, Ltd., Seoul (KR)

(72) Inventors: Joo-Sung Lee, Daejeon (KR); A-Young Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 457 days.

(21) Appl. No.: 17/053,996

(22) PCT Filed: Jun. 12, 2019

(86) PCT No.: PCT/KR2019/007106
§ 371 (c)(1),
(2) Date: Nov. 9, 2020

(87) PCT Pub. No.: WO2019/240500
PCT Pub. Date: Dec. 19, 2019

(65) Prior Publication Data
US 2021/0242538 A1    Aug. 5, 2021

(30) Foreign Application Priority Data
Jun. 12, 2018    (KR) .......... 10-2018-0067487

(51) Int. Cl.
*H01M 50/46*    (2021.01)
*H01M 50/403*    (2021.01)
(Continued)

(52) U.S. Cl.
CPC ....... *H01M 50/461* (2021.01); *H01M 50/403* (2021.01); *H01M 50/414* (2021.01);
(Continued)

(58) Field of Classification Search
CPC ............. H01M 50/461; H01M 50/403; H01M 50/414; H01M 50/463
See application file for complete search history.

(56) References Cited

U.S. PATENT DOCUMENTS 6,692,543 B1 *   2/2004 Hamano ........... H01M 10/0525
                                                          29/623.5
2010/0323230 A1   12/2010 Lee et al.
(Continued)

FOREIGN PATENT DOCUMENTS

CN    105684190 A    6/2016
EP    3764449 A1    1/2021
(Continued)

OTHER PUBLICATIONS

International Search Report for Application No. PCT/US2019/007106 mailed Sep. 20, 2019, 2 pages.
(Continued)

*Primary Examiner* — Matthew T Martin
*Assistant Examiner* — Bartholomew A Hornsby
(74) *Attorney, Agent, or Firm* — Lerner David LLP

(57) ABSTRACT

A separator for an electrochemical device is provided. The separator includes a porous polymer substrate, and an electrode adhesive layer formed on at least one surface of the porous polymer substrate, wherein the electrode adhesive layer includes a binder polymer and has at least two electrode adhesive layer units including at least two lines extending from a long side to a short side of the separator, and the units do not cross each other. Herein, a unit merely formed by lines extending from one long side to the other long side of the separator, or a unit merely formed by lines extending from one short side to the other short side of the separator is not included. The separator is effective for reducing a time required for impregnation of an electrode (Continued)

with an electrolyte, while providing excellent electrode-separator adhesion.

6 Claims, 4 Drawing Sheets

(51) Int. Cl.
    *H01M 50/409*     (2021.01)
    *H01M 50/414*     (2021.01)
    *H01M 50/443*     (2021.01)
    *H01M 50/463*     (2021.01)
    *H01M 50/489*     (2021.01)
    *H01M 50/491*     (2021.01)

(52) U.S. Cl.
    CPC ........ *H01M 50/463* (2021.01); *H01M 50/409* (2021.01); *H01M 50/443* (2021.01); *H01M 50/489* (2021.01); *H01M 50/491* (2021.01)

(56) References Cited

U.S. PATENT DOCUMENTS

| | | | |
|---|---|---|---|
| 2014/0011093 A1* | 1/2014 | Kim .................... | H01M 50/403 521/64 |
| 2016/0049628 A1 | 2/2016 | Kim et al. | |
| 2017/0054123 A1* | 2/2017 | Miller .................. | H01M 50/44 |
| 2017/0170441 A1* | 6/2017 | Arnold ................. | H01M 50/46 |
| 2017/0324073 A1* | 11/2017 | Herle ................... | H01M 50/431 |
| 2018/0040865 A1* | 2/2018 | Lee ..................... | H01M 50/463 |
| 2018/0309108 A1 | 10/2018 | Shin et al. | |
| 2018/0351194 A1 | 12/2018 | Lee et al. | |
| 2019/0051924 A1 | 2/2019 | Kim et al. | |
| 2019/0131604 A1 | 5/2019 | Yoon et al. | |
| 2021/0036375 A1* | 2/2021 | Sato .................. | H01M 10/0585 |

FOREIGN PATENT DOCUMENTS

| | | | | |
|---|---|---|---|---|
| JP | 2012204303 A | * | 10/2012 | |
| JP | 2015103482 A | * | 6/2015 | |
| JP | 2017500688 A | | 1/2017 | |
| KR | 20090083854 A | | 8/2009 | |
| KR | 20130045601 A | | 5/2013 | |
| KR | 20150048082 A | * | 5/2015 | |
| KR | 20160020283 A | | 2/2016 | |
| KR | 101631249 B1 | | 6/2016 | |
| KR | 20160106521 A | | 9/2016 | |
| KR | 101686599 B1 | | 12/2016 | |
| KR | 20170113474 A | | 10/2017 | |
| KR | 20170124336 A | | 11/2017 | |
| KR | 20180018408 A | | 2/2018 | |
| KR | 20180061017 A | | 6/2018 | |
| WO | 2015060698 A1 | | 4/2015 | |
| WO | WO-2017105156 A1 | * | 6/2017 | ........ H01M 10/0459 |
| WO | 2018030797 A1 | | 2/2018 | |

OTHER PUBLICATIONS

Extended European Search Report including Written Opinion for Application No. 19819891.3 dated Jun. 4, 2021, pp. 1-8.
Search Report dated Jun. 16, 2022 from the Office Action for Taiwanese Application No. 108119897 issued Jun. 20, 2022, 1 page. [See p. 1, categorizing the cited references].

* cited by examiner

SEPARATOR FOR ELECTROCHEMICAL DEVICE COMPRISING A PATTERNED ELECTRODE ADHESIVE LAYER AND A METHOD FOR MANUFACTURING THE SEPARATOR

CROSS-REFERENCE TO RELATED APPLICATION

The present application is a national phase entry under 35 U.S.C. § 371 of International Application No. PCT/KR2019/007106 filed Jun. 12, 2019, which claims priority from Korean Patent Application No. 10-2018-0067487 filed on Jun. 12, 2018 in the Republic of Korea, the disclosures of which are incorporated herein by reference.

TECHNICAL FIELD

The present disclosure relates to a separator for an electrochemical device which includes a patterned electrode adhesive layer and a method for manufacturing the separator.

BACKGROUND ART

Recently, many attentions have been given to electrochemical devices about ensuring their safety. Particularly, a secondary battery, such as a lithium secondary battery, has an electrode assembly including a positive electrode, a negative electrode and a separator. Such an electrode assembly may have a structure including a separator interposed between the positive electrode and the negative electrode.

The separator used for a lithium secondary battery takes a porous woven web or non-woven web shape, or is a porous separator having pores formed through a dry process or wet process, in the case of a film or membrane. However, such a porous separator uses a binder to improve adhesion with an electrode. Such a binder not only is coated on the surface of a porous polymer substrate but also infiltrates into the pores of the porous polymer substrate to cause damage upon the ion channel function of the separator undesirably.

The porous separator may be provided with an electrode adhesive layer thereon in order to form an electrode assembly or battery (cell) by being assembled with electrodes. The presence/absence of such an electrode adhesive layer and/or adhesion realization point and/or extent of adhesion may be varied depending on particular types of lithium secondary batteries.

Lithium secondary batteries may be classified into: wound type (jelly-roll type) lithium secondary batteries formed by winding a positive electrode and a negative electrode cylindrically; stack type lithium secondary batteries formed by stacking a positive electrode, a negative electrode and a separator successively; and stack-folding type lithium secondary batteries, a combination of the above two types, formed by folding/winding a unit cell including a positive electrode, a negative electrode and a separator with an elongated sheet-like continuous folding film (e.g. separator).

Among them, stack type or stack-folding type lithium secondary batteries are easy to manufacture, have a structure capable of utilizing the space efficiently and can maximize the content of electrode active materials, and thus can realize batteries with a high integration degree. In the case of such stack type or stack-folding type lithium secondary batteries, the stack type or stack-folding type structure may be obtained in its regular position, when the electrode adhesive layer provided on the separator provides adhesion with an electrode in a dry state.

However, when an electrolyte is injected after the electrode assembly is received in a battery casing, the adhered electrode does not allow interconnection of pores through which electrolyte is impregnated. Thus, it takes a long time to impregnate the electrode with the electrolyte. As a result, there is a problem in that an excessively long period of time is required for aging of the secondary battery.

The jelly-roll type lithium secondary battery less requires adhesion between the electrode and the separator as compared to the stack-folding type lithium secondary battery. However, the jelly-roll type lithium secondary battery may be provided with an adhesive functional layer on the separator in order to prevent the electrode assembly from twisting. In this case, there is a problem in that an excessively long time is required to impregnate the electrode with the electrolyte.

DISCLOSURE

Technical Problem

The present disclosure is designed to solve the problems of the related art, and therefore the present disclosure is directed to providing a separator which includes an electrode adhesive layer formed thereon for the purpose of electrode-separator adhesion, and shows improved electrolyte impregnation property at the electrode-separator interface.

The present disclosure is also directed to providing an electrochemical device, particularly a lithium secondary battery, including a positive electrode, a negative electrode, a separator interposed between the positive electrode and the negative electrode, and an electrolyte, the electrochemical device including the separator provided with an electrode adhesive layer.

In addition, the present disclosure is directed to providing a method for forming a patterned electrode adhesive layer on a separator while not causing twisting of an electrode assembly.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a separator for an electrochemical device. According to the first embodiment, there is provided a separator for an electrochemical device, including: a porous polymer substrate; and an electrode adhesive layer formed on at least one surface of the porous polymer substrate, wherein the electrode adhesive layer includes at least two units containing a binder polymer, the units are separated from each other by a non-coated portion having no electrode adhesive layer, the separator has a polygonal shape having at least four sides, the polygon has an internal angle larger than 0° and smaller than 180°, the non-coated portion extends from one side (first side) to another side (second side) of the separator in a linear shape having a predetermined width, and the first side and the second side are adjoining each other and are linked to each other by means of any one point.

According to the second embodiment, there is provided the separator according to the first embodiment, which has a quadrangular surface shape.

According to the third embodiment, there is provided the separator according to the first or the second embodiment, which has a rectangular surface shape having an aspect ratio larger than 1, includes at least one linear non-coated portion extending from a long side to a short side of the separator, and the linear non-coated portion does not include a non-coated portion extending from one long side to the other long side of the separator or a non-coated portion extending from one short side to the other short side of the separator.

According to the fourth embodiment, there is provided the separator according to any one of the first to the third embodiments, wherein the patterned electrode adhesive layer is formed on the separator at a ratio of 70-95% based on the total area of the separator.

According to the fifth embodiment, there is provided the separator according to any one of the first to the fourth embodiments, wherein the electrode adhesive layer of the separator for an electrochemical device is in a dry state.

According to the sixth embodiment, there is provided an electrochemical device including a positive electrode, a negative electrode, a separator interposed between the positive electrode and the negative electrode, and an electrolyte, wherein the separator is defined in any one of the first to the fifth embodiments.

According to the seventh embodiment, there is provided a method for manufacturing the separator as defined in any one of the first to the fifth embodiments, the method including the steps of: mixing a binder polymer resin with an organic solvent to prepare a binder solution; coating the binder solution on the surface of a porous polymer substrate with a predetermined pattern to form a pattern of the binder solution on the surface; forming micropores on the electrode adhesive layer through phase separation between a solvent and a non-solvent in the coated binder solution; and forming a patterned electrode adhesive layer on at least one surface of the separator.

According to the eighth embodiment, there is provided the method as defined in the seventh embodiment, wherein the binder polymer resin is present in an amount of 3-50 wt % based on the weight of the binder solution.

Advantageous Effects

According to an embodiment of the present disclosure, it is possible to improve electrolyte impregnation property at the electrode-separator interface while providing excellent electrode-separator adhesion, when forming an electrode adhesive layer with a specific pattern on the separator.

As a result, it is possible to reduce the time required for an aging step in which an electrode is impregnated with an electrolyte, after manufacturing a lithium secondary battery.

In addition, according to another embodiment of the present disclosure, a phase separation step is included in a step of forming a patterned electrode adhesive layer. Therefore, no twisting of an electrode assembly occurs after applying the electrode adhesive layer. In addition, it is possible to provide excellent electrolyte impregnation property and to maintain a low level of resistance of the separator.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Figure 1:
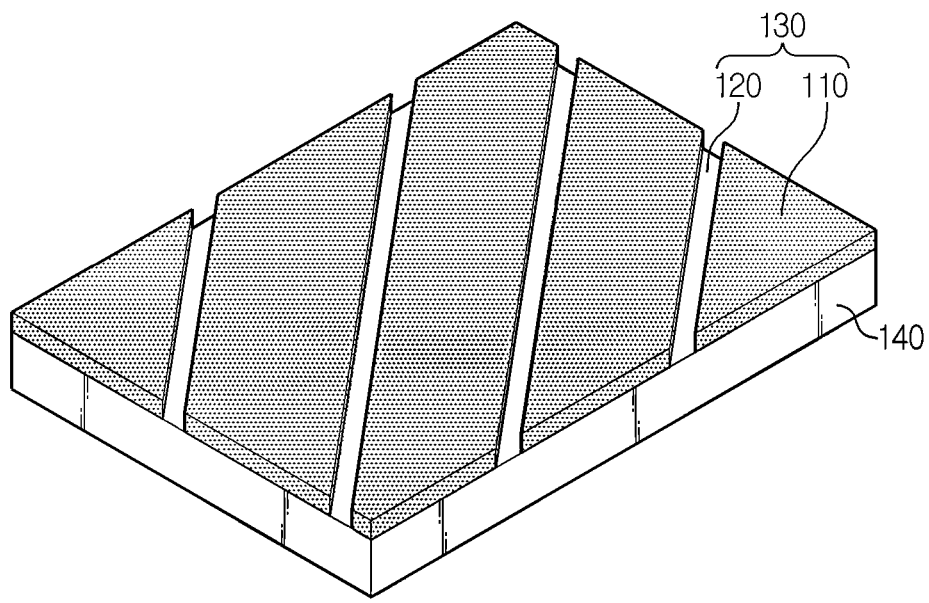
FIG. 1 is a schematic view illustrating a separator(100) including an electrode adhesive layer(130) according to an embodiment of the present disclosure, wherein the black-colored portion shows a portion having an electrode adhesive layer(130) and the white-colored portion shows a portion having no adhesive layer, non-coated portion(120).

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

To solve the above-mentioned technical problem, there is provided a separator for an electrochemical device. The separator is used as a separator for an electrochemical device and a constitutional element included in a unit cell. The separator(100) includes: a porous polymer substrate(140); and an electrode adhesive layer(130) formed on at least one surface of the porous polymer substrate. Herein, the electrode adhesive layer includes: at least one unit(s)(110) containing a binder polymer and covering a part of the surface of the porous polymer substrate; and at least one non-coated portion(s)(120) having no such units. According to an embodiment of the present disclosure, the non-coated portion has a linear shape having a predetermined width, and the linear shape may be a straight line, curved line, folded (broken) line folded at least once in any one portion, dotted line, alternate long and short dash line, or the like. The non-coated portion extends from [one side] to [another side] forming the outermost line of the separator at one end thereof, wherein the above-mentioned [one side] and [another side] are adjoining each other and meet at any one point. In other words, the electrode adhesive layer is surface-split by the non-coated portion and may include at least two electrode adhesive layer units separated from each other by a predetermined interval. According to an embodiment of the present disclosure, the separator may be a polygon whose planar shape has n sides, and the non-coated portion is disposed in such a manner that it links two neighboring sides with each other. The planar shape means a shape defined by the outline of the separator when the separator is viewed from the above. For example, the planar shape of the separator may be defined by the shape of the polymer substrate included in the separator. Herein, n is an integer of 3 or more. In other words, one end of the non-coated portion starts from one side of the planar polygon of the separator and the other end of the non-coated portion extends to another side, wherein the above-mentioned one side and another side are adjoining each other (i.e. connected to each other by means of any one point). According to an embodiment of the present disclosure, the electrode adhesive layer includes at least two units, and the units are separated from each other by a predetermined interval through the non-coated portion. According to an embodiment of the present disclosure, a non-coated portion having no electrode adhesive layer is present between the units, and the units do not cross each other.

According to an embodiment of the present disclosure, the electrode adhesive layer may include at least two units.

According to an embodiment of the present disclosure, the separator is a tetragon which has a planar shape enclosed with four sides and each internal angle of the tetragon is smaller than 180°. Particularly, the planar shape of the separator has an internal angle of 90°, and may be a square all sides of which has the same length, or may be a rectangle two opposite sides of which have the same length.

As used herein, the term 'unit cell' refers to an element forming an electrochemical device and including a positive electrode, a separator and a negative electrode, stacked successively. The term 'unit cell' may be used exchangeably with 'electrode assembly'.

According to an embodiment of the present disclosure, the separator may be a rectangle two opposite sides of which have the same length, wherein either side of two neighboring sides has a larger length than the other side. When the separator has such a rectangular shape, the non-coated portion may extend from a long side to a short side. Herein, the term 'long side' is used to indicate two sides having a relatively larger length of the four sides forming the separator having a rectangular shape. The term 'short side' is used to indicate two sides having a relatively smaller length of the four sides forming the separator having a rectangular shape.

Figure 2:
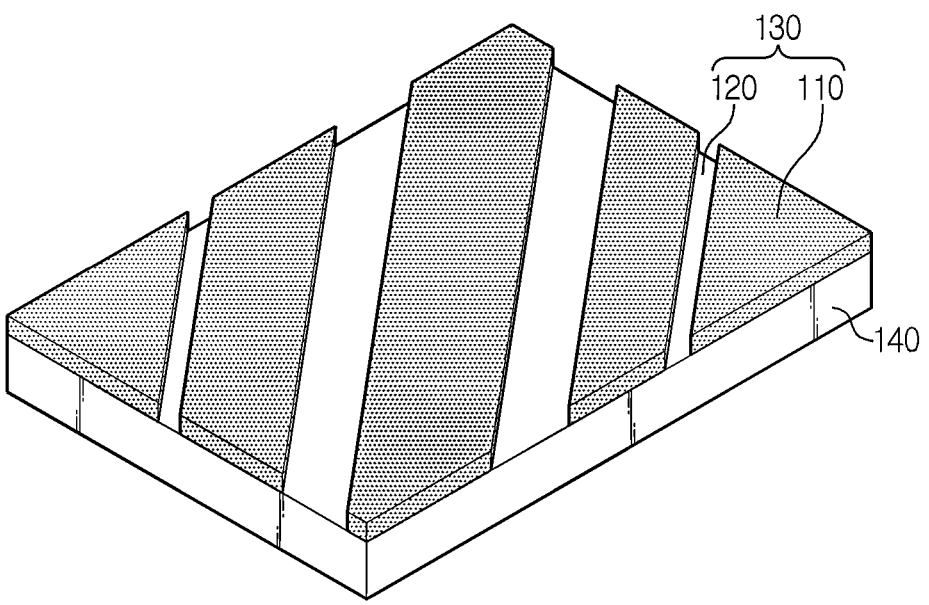
FIG. 2 is a schematic view illustrating a separator(100) including an electrode adhesive layer(130) according to another embodiment of the present disclosure, wherein the black-colored portion shows a portion having an electrode adhesive layer(130) and the white-colored portion shows a portion having no adhesive layer, non-coated portion(120).
Figure 3:
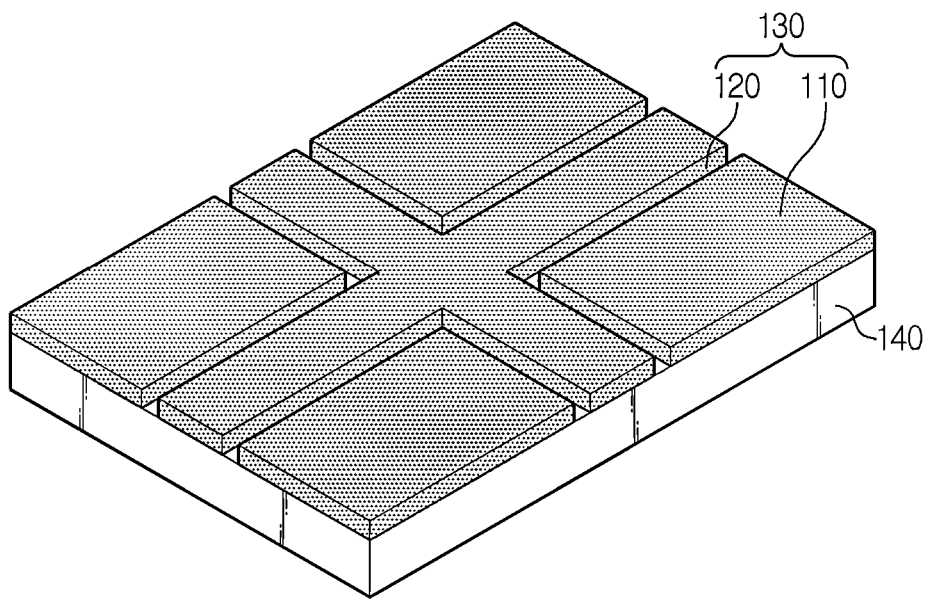
FIG. 3 is a schematic view illustrating a separator including an electrode adhesive layer according to still another embodiment of the present disclosure, wherein the black-colored portion shows a portion having an electrode adhesive layer(130) and the white-colored portion shows a portion having no adhesive layer, non-coated portion(120).

As used herein, 'electrode adhesive layer unit' or 'unit' refers to a portion formed by straight lines, curved lines or a combination thereof, having a two-dimensional closed curve shape with a predetermined area, and substantially including a binder polymer. For example, each of the electrode adhesive layers as shown in FIGS. 1-3 includes five units, and the electrode adhesive layer shown in FIG. 4 includes three units. The units have a planar shape, such as a rectangle, square, trapezoid whose upper side is longer, trapezoid whose lower side is longer, semi-circle or a triangle, to form a patterned electrode adhesive layer. However, the unit shape is not limited thereto.

An 'electrode adhesive layer non-coated portion' to which no electrode adhesive layer is applied is present between the units. As used herein, 'electrode adhesive layer non-coated portion' refers to a portion to which no electrode adhesive layer is applied on the surface of the separator. Since the electrode adhesive layer or other functional layers are not formed substantially in the electrode adhesive layer non-coated portion, only an electrolyte is present substantially therein in a finished lithium secondary battery. To ensure such an electrode adhesive layer non-coated portion, it is preferred to prevent spreading of a binder solution for forming an electrode adhesive layer, when the binder solution is applied to a porous polymer substrate or organic/inorganic porous coating layer surface. Thus, it is preferred that the binder solution has a viscosity of 30 centipoises or more.

In the specification, the units and non-coated portion may be referred to as 'electrode adhesive layer' as a whole.

The electrode adhesive layer units may be designed and disposed in such a manner that the area of the electrode adhesive layer non-coated portion is increased toward the center of the separator. According to an embodiment of the present disclosure, the width of the non-coated portion may be increased continuously or step-wise toward the center of the separator and/or may be decreased continuously or step-wise from the center to the edge of the separator. In addition, the electrode adhesive layer units may be designed and disposed in such a manner that the distance to the center may be minimized based on the side to which an electrolyte is introduced. In this manner, it is possible to minimize the path through which the electrolyte passes rapidly.

This is because when an electrode is impregnated with an electrolyte, the center of the electrode requires a longer period of time to be impregnated with the electrolyte, as compared to the edge of the electrode. In a process for manufacturing a battery, a step of allowing a battery to stand for a predetermined time (an aging step) is carried out, after the assemblage of the battery and injection of an electrolyte, in order to allow the electrode assembly (200) to be impregnated sufficiently with the electrolyte. In the aging step, the battery generally is allowed to stand in an erect state in which long side of the electrode assembly faces the bottom or the top. Therefore, impregnation with an electrolyte is started from the long side. Thus, when the separator has an electrode adhesive layer pattern in which the non-coated portion extends from one short side to another short side, impregnation distance required for the electrolyte to reach the center is increased undesirably. Therefore, according to an embodiment of the present disclosure, the separator may be provided with an electrode adhesive layer including only a linear non-coated portion extending from a long side to a short side. When the battery including the separator is subjected to an aging step and the battery is erect so that the long side of the separator faces the bottom, it is possible to improve electrolyte impregnation efficiency.

FIGS. 1-3 illustrate exemplary embodiments of a separator (100) having the patterned electrode adhesive layer formed thereon according to the present disclosure.

FIG. 1 illustrates a patterned electrode adhesive layer (130) having a plurality of units (110, black-colored portion) formed by straight lines extending from a long side to a short side. An electrode adhesive layer non-coated portion (120, white-colored portion) having no adhesive layer is present between the electrode adhesive layer units. The electrode adhesive layer includes units having a hexagonal shape, trapezoidal shape whose upper side is longer, trapezoidal shape whose lower side is longer and a triangular shape, and such units are positioned at all of the four edges of the separator. It can be seen that the total area of units of the patterned electrode adhesive layer is significantly larger than the total area of the electrode adhesive layer non-coated portion. The electrode adhesive layer non-coated portions are formed in order to allow an electrode to be impregnated with an electrolyte more rapidly and easily and each non-coated portion may have the same width.

FIG. 2 illustrates a patterned electrode adhesive layer having a plurality of units (black-colored portion) formed by straight lines extending from a long side to a short side, and is similar to FIG. 1 in that an electrode adhesive layer non-coated portion is present between the units. However, the electrode adhesive layer non-coated portion in FIG. 2 is designed to have a relatively larger width at the center of the separator to ensure a larger electrolyte impregnation interface at the center of an electrode. On the other hand, the electrode adhesive layer non-coated portion at the edge of the separator is designed to have a relatively smaller width to allow more effective separator-electrode adhesion.

FIG. 3 illustrates an electrode adhesive layer pattern formed by the lines extending from a long side to a short side and folded once. The electrode adhesive layer pattern includes units having a tetragonal shape and cross shape, and such units are positioned at all of the four edges of the separator.

Figure 4:
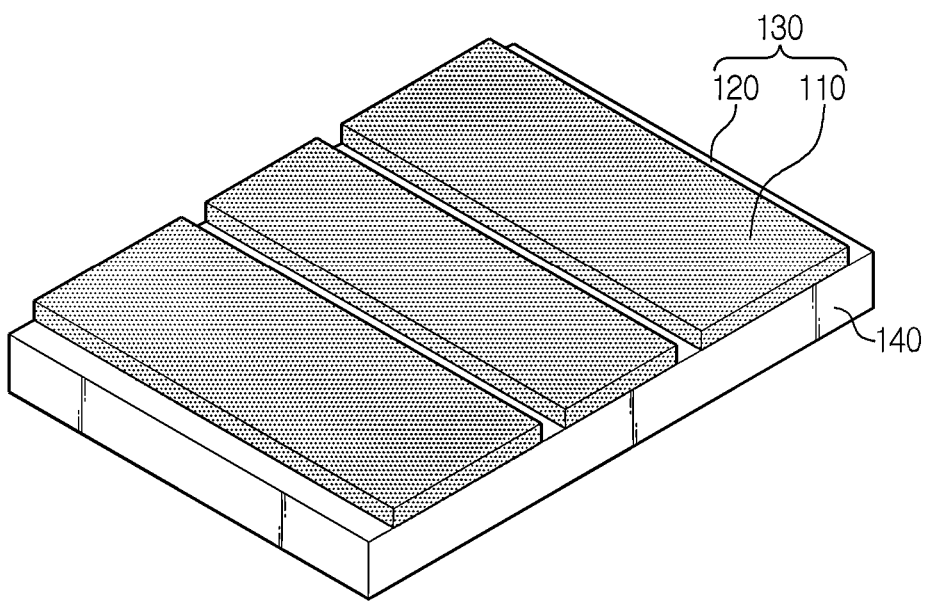
FIG. 4 is a schematic view illustrating a separator including an electrode adhesive layer according to the related art, wherein the black-colored portion shows a portion having an electrode adhesive layer and the white-colored portion shows a portion having no electrode adhesive layer.

Meanwhile, a unit merely formed by lines extending from one long side to the other long side of the separator, or a unit merely formed by lines extending from one short side to the other short side of the separator is not included to the patterned electrode adhesive layer according to the present disclosure. When the unit merely formed by lines extending from one long side to the other long side of the separator, or the unit merely formed by lines extending from one short side to the other short side of the separator is included in a patterned electrode adhesive layer, any electrode adhesive layer may not be applied to the edge of the long side or short side. This is shown in FIG. 4. Referring to FIG. 4, no electrode adhesive layer is formed at the edge of the short side of the separator so that separator-electrode adhesion may not be performed suitably.

According to an embodiment of the present disclosure, the patterned electrode adhesive layer may include the unit portion at a ratio of at least 70% or at least 75% and at most 95% or at most 90%, based on the total surface area of the separator. When the unit portion is formed at a ratio less than the lower limit, it is difficult to form firm adhesion between the separator and an electrode. When the unit portion is formed at a ratio larger than the upper limit, it is not possible to accomplish the object of improving electrolyte impregnation property of an electrode according to the present disclosure.

According to an embodiment of the present disclosure, the unit may have a width (interval between adjacent electrode adhesive layer non-coated portions) may be 5-30 mm, or 10-25 mm. The width of the unit means the longest width of the closed curve forming the unit. Meanwhile, the interval between the units (width of the electrode adhesive layer non-coated portion) may be 0.1-3 mm, or 0.5-1 mm. In addition, the thickness (height) of the unit forming the electrode adhesive layer may be 0.1-3 µm, or 0.5-1 µm.

According to an embodiment of the present disclosure, the electrode adhesive layer units may be positioned at all of the four edges of the separator.

The binder polymer forming the patterned electrode adhesive layer may be at least one selected from the group consisting of polyvinylidene fluoride (PVDF) resins, styrene-butadiene rubber (SBR), polytetrafluoroethylene (PTFE), polyethylene glycol (PEG), polypropylene glycol (PPG), toluene diisocyanate (TDI), polymethylmethacrylate, polyacrylonitrile, polyvinylpyrrolidone, polyvinyl acetate, polyethylene-co-vinyl acetate, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, acrylonitrile-styrene-butadiene copolymer, polyimide and combinations thereof, but is not limited thereto.

Non-limiting examples of polyvinylidene fluoride (PVDF) include polyvinylidene fluoride-co-hexafluoropropylene, polyvinylidene fluoride-co-trichlroethylene, polyvinylidene fluoride-co-tetrafluoroethylene, polyvinylidene fluoride-co-trifluoroethylene, polyvinylidene fluoride-co-trifluoroethylene, polyvinylidene fluoride-co-trifluorochloroethylene, polyvinylidene fluoride-co-ethylene and combinations thereof, but are not limited thereto.

The patterned electrode adhesive layer may further include a small amount of additive. The patterned electrode adhesive layer may further include impurities incorporated during the manufacturing process. Even in this case, it is thought that the patterned electrode adhesive layer substantially includes a binder polymer.

In another aspect of the present disclosure, there is provided a method for forming a patterned electrode adhesive layer on a separator. According to an embodiment, the method includes the steps of: mixing a binder polymer resin with an organic solvent to prepare a binder solution; coating the binder solution on the surface of a porous polymer substrate with a predetermined pattern to form a pattern of the binder solution on the surface; forming micropores on the electrode adhesive layer through solvent/non-solvent phase separation in the coated binder solution; and forming a patterned electrode adhesive layer on at least one surface of the separator.

When the binder solution is applied directly to the separator, the binder solution permeates through the pores so that the amount of binder polymer present on the separator surface becomes insufficient and the pores of the separator are blocked due to the binder solution to cause a decrease in air permeability of the separator. To solve this, according to the related art (WO2015/060698) discloses a method which includes coating and drying a binder solution on a release member, and transferring the coating to a porous polymer substrate by using a transfer member. However, the method according to the related art requires a complicated process and high cost.

The present disclosure solves the above-mentioned problems according to the related art. It is possible to solve the problem of permeation of the binder polymer ingredient through the pores by partially gelling the binder polymer ingredient through phase separation. In addition, it is possible to reduce the resistance of the electrode adhesive layer by forming micropores on the binder polymer surface through such phase separation. The phase separation method is not particularly limited, as long as it uses a solvent and a non-solvent. Particular examples of the method include a method of adding a part of non-solvent during a step of preparing a binder solution, a method including applying a binder solution dissolved in a solvent and dipping the separator in a non-solvent to carry out solvent exchange, a method including condensing a non-solvent into a semi-dried coating layer through the latent heat of evaporation during a step of applying and drying a binder solution dissolved in a solvent, or the like. The separator obtained by the above-described method shows no pore blocking of the separator caused by the binder solution, and thus provides the separator with excellent air permeability and imparts binding force with another constitutional element, such as an electrode, of an electrochemical device. In addition, since the adhesive binder is formed with a pattern having a non-coated portion, the surface of the separator is exposed to the outside at the non-coated portion, thereby providing excellent air permeability.

Hereinafter, the method for forming an electrode adhesive layer on a separator according to the present disclosure will be explained in more detail.

First, a binder solution is prepared (S1). The binder solution may be prepared in the form of a mixture of a binder polymer resin with a solvent obtained by dispersing a binder polymer resin in an organic solvent. The content of the binder polymer resin may be varied with the thickness of the patterned electrode adhesive layer formed in the subsequent step. Preferably, the binder polymer resin may be present in an amount of about 3-50 wt %, more preferably about 5-30 wt % based on the weight of the binder solution. In other words, the binder polymer resin may be present in an amount of about 3-50 parts by weight, preferably about 5-30 parts by weight, based on 100 parts by weight of the total weight of the binder solution. In this manner, the binder solution may have a viscosity of 30 centipoises or more so that spreading of the binder solution for forming an electrode adhesive layer may be prevented, when the binder solution is applied to a porous polymer substrate, or the like, thereby ensuring an electrode adhesive layer non-coated portion preferably.

According to an embodiment of the present disclosure, the solvent preferably has a solubility parameter similar to the solubility parameter of the binder polymer resin so that the solvent may be mixed homogeneously with the binder polymer resin. Meanwhile, it is preferred to use a solvent having a high boiling point in order to prevent blocking of a nozzle when the binder solution is sprayed through the nozzle, such as an inkjet printer, in the subsequent step. In addition, heat is applied to the binder pattern during the subsequent step to remove the organic solvent. Herein, it is not preferred to use an organic solvent having an excessively high boiling point in order to remove the organic solvent effectively. Considering the above, the solvent may have a boiling point of 80-180° C., or 100-165° C. According to the present disclosure, non-limiting examples of the solvent include at least one selected from the group consisting of cyclohexane, mesitylene, dimethylacetamide, dimethylsulfone, dimethylcarbonate, acetone, tetrahydrofuran, methylene chloride, chloroform, dimethylformamide, N-methyl-2-pyrrolidone (NMP), methyl ethyl ketone, methyl acetate, cyclohexanone and combinations thereof. Preferably, the solvent may include at least one selected from the group consisting of N-methyl-2-pyrrolidone (NMP), cyclohexane, mesitylene, dimethylacetamide, dimethylsulfone, dimethylcarbonate and combinations thereof.

Next, the binder solution is coated on the surface of a porous polymer substrate with a predetermined pattern (S2). The coating method is not particularly limited, as long as it is a coating process capable of forming a pattern of the binder solution on the surface of the porous polymer substrate. According to an embodiment of the present disclosure, the coating may be carried out by using an ink jet printer, dispenser, microgravure or nozzle.

Then, a non-solvent is allowed to be in contact with the binder solution to carry out phase separation of the binder polymer (S3). It is preferred that the non-solvent used herein has a solubility parameter different from the solubility parameter of the binder polymer resin. Non-limiting examples of the non-solvent include at least one selected from the group consisting of water, methanol, ethanol and combinations thereof. The non-solvent contact time varies depending on solubility parameter but may be controlled within a range of about 10 seconds to about 2 minutes, preferably about 20 seconds to about 60 seconds. When the non-solvent contact time is excessively short, no phase separation effect is realized and the binder solution permeates into the porous polymer substrate to cause an increase in resistance undesirably. When the non-solvent contact time is excessively long, the size of pores formed on the electrode adhesive layer is increased, thereby making it difficult to ensure adhesion to an electrode.

After that, the solvent is removed from the binder solution coated on the surface of the porous polymer substrate (S4). The solvent may be removed by heating the pattern of the binder solution. In general, the heating may be carried out by using a heater, oven, resistance heater, electric induction heater, hot air heater, infrared ray heater, or the like. The porous polymer substrate functions not only as a support on which the binder solution is coated but also as a means for removing the organic solvent contained in the binder solution through drying of the binder solution. Therefore, the heating may be carried out by heating the porous polymer substrate through the above-mentioned heating means provided in the porous polymer substrate. The heating may be carried out at a temperature of about 40-200° C., preferably about 60-150° C., and more preferably about 80-120° C. In addition, the heating may be carried out for about 3-180 seconds, preferably for about 1-60 seconds. The patterned electrode adhesive layer transferred in this manner may be a dry-state electrode adhesive layer containing no solvent.

Then, a patterned electrode adhesive layer is formed on the surface of the separator substrate (S5). The patterned electrode adhesive layer has a predetermined pattern. As described above, the pattern includes one or more patterns formed by the lines extending from a long side to a short side of the separator, wherein the patterns are formed so that they do not cross each other. The patterned electrode adhesive layer includes an electrode adhesive layer non-coated portion, i.e. a portion to which no binder is applied.

According to an embodiment of the present disclosure, the patterned electrode adhesive layer may have a thickness of about 0.1-3 μm, preferably about 0.5-1 μm. When the thickness of the electrode adhesive layer is within the above-defined range, it is possible to obtain excellent adhesion/binding force between the porous separator and an electrode and to maintain the porosity of the separator to an optimized state.

In still another aspect of the present disclosure, there is provided a separator for a secondary battery including the patterned electrode adhesive layer obtained by the above-described method. According to an embodiment of the present disclosure, the separator may include a porous polymer substrate; and a patterned electrode adhesive layer formed on at least one surface of the porous polymer substrate.

According to an embodiment of the present disclosure, the porous polymer substrate may include a polymer membrane including at least one polymer resin or a multilayer membrane formed by stacking two or more layers of the polymer membranes, woven web, non-woven web, monolayer film or a multilayer film. Among them, the film may have a porous structure by forming pores through a dry process or wet process known to those skilled in the art.

Preferably, the separator substrate layer may include a polyolefin-based porous film. The porous polymer substrate layer has a plurality of pores so as to provide desired porosity and air permeability. The pores basically function as ion channels in a battery. In addition, the pores has a function (shutdown function) of preventing an additional increase in temperature of a battery by blocking a path in a membrane through the melting of the inner part of the membrane forming the pores, when the temperature of the battery is increased above a predetermined range due to an external cause or internal cause, such as a short circuit.

In addition, the patterned electrode adhesive layer according to the present disclosure is maintained to a predetermined thickness on the surface of the separator coated with the same. Such a thickness of the patterned electrode adhesive layer may improve the durability of the separator and battery against external force, since localized force is not applied to the surface of the patterned electrode adhesive layer, when the patterned electrode adhesive layer is joined with a porous polymer substrate and electrodes to form an electrode assembly, cell or a battery subsequently.

In addition, according to an embodiment of the present disclosure, the separator may further include an organic/inorganic porous coating layer between the porous polymer substrate and the patterned electrode adhesive layer. When the separator further includes an organic/inorganic porous coating layer, the patterned electrode adhesive layer is coated onto the surface of the organic/inorganic porous coating layer. According to the present disclosure, the organic/inorganic porous coating layer may include inorganic particles and a binder. The organic/inorganic porous coating layer has porous characteristics by the pores formed by interstitial volumes among the inorganic particles. The interstitial volume means a space defined by the inorganic particles facing each other substantially in a packed structure of the inorganic particles.

According to an embodiment of the present disclosure, there is no particular limitation in the inorganic particles, as long as they are electrochemically stable and have a particle size that meets the thickness of the porous coating layer. In other words, there is no particular limitation in the inorganic particles that may be used herein, as long as they cause no oxidation and/or reduction in the range (e.g. 0-5V based on Li/Li$^+$) of operating voltage of an applicable electrochemical device. For example, the inorganic particles may have a particle diameter of 0.001-3 μm or 0.001-2 μm. When the inorganic particles have a size smaller than 0.001 μm, dispersibility may be degraded. When the inorganic particles have a size larger than 3 μm, the resultant coating layer may have an increased thickness.

Non-limiting examples of the inorganic particles include $Al_2O_3$, AlOOH, $Al(OH)_3$, AlN, BN, MgO, $Mg(OH)_2$, $SiO_2$, ZnO, $TiO_2$, $BaTiO_3$ or a combination thereof.

In addition, there is no particular limitation in the binder, as long as it can provide binding force among the inorganic particles and binding force between the inorganic particles and the separator substrate. The content of the inorganic particles may be 90-99 wt % based on 100 wt % of the porous coating layer.

There is no particular limitation in the thickness of the organic/inorganic porous coating layer including the inorganic particles and the binder. Based on one surface of the porous polymer substrate, the thickness may be 0.001-5 μm, preferably.

In addition, there is no particular limitation in the pore size and porosity of the organic/inorganic porous coating layer. The pore size preferably ranges from 0.001 μm to 3 μm, or from 0.001 μm to 2 μm. The porosity preferably ranges from 10% to 90%. The pore size and porosity mainly depend on the size of the inorganic particles but are also affected by the particular type of binder. For example, when using inorganic particles having a particle diameter of 1 μm or less, the resultant pores may have a size of about 1 μm or less. Such a porous structure is filled with the electrolyte injected subsequently and the electrolyte functions to transport ions. When the pore size and porosity are less than 0.001 μm and 10%, respectively, the organic/inorganic porous coating layer may function as a resistance layer. When the pore size and porosity are more than 3 μm and 90%, respectively, mechanical properties may be degraded. The separator having a porous coating layer formed thereon may have a thickness of 1-100 μm, particularly 10-40 μm.

According to an embodiment of the present disclosure, the organic/inorganic porous coating layer may be formed by mixing inorganic particles and a binder with an adequate solvent to prepare slurry for forming an organic/inorganic porous coating layer, and applying the slurry to the surface of a porous polymer substrate through a dip coating process, slot die coating process, microgravure coating process, wire coating process or a doctor blade coating process, followed by drying. The solvent preferably has a solubility parameter similar to the solubility parameter of the binder to be used and a low boiling point. This is for the purpose of facilitating homogeneous mixing and the subsequent solvent removal. Non-limiting examples of the solvent that may be used include acetone, tetrahydrofuran, methylene chloride, chloroform, dimethylformamide, N-methyl-2-pyrrolidone (NMP), cyclohexane or a combination thereof.

In yet another aspect of the present disclosure, there are provided an electrode assembly(200) including a separator having a patterned electrode adhesive layer between a positive electrode and a negative electrode, and an electrochemical device including the electrode assembly.

The electrode assembly may be obtained through a pressing step using at least two rotating rolls facing each other. The pressing step may be carried out by hot press rolling, cold press rolling or a combination thereof.

Hot press rolling is a press rolling method including passing an object between two rotating rolls at a temperature higher than the recrystallization temperature of the object. The hot press roll used herein facilitates deformation processing, when it presses an object at a temperature of about a half of the melting point (absolute temperature) of the object. In addition, hot press rolling is advantageous in that it requires low press rolling power and can induce large deformation with ease. Therefore, the hot press rolling temperature, roll rotation speed, or the like, may be controlled depending on the condition/state required for an electrode assembly.

Cold press rolling is a press rolling method using rolls at a temperature lower than the recrystallization temperature of an object. Since cold press rolls used herein are not necessarily different from the hot press rolls, any rolls may be used for the purpose of hot press rolling or cold press rolling situationally. The surface state of a roll may affect directly an object without any special damage upon the surface of the object. Therefore, cold press rolling can correct defects caused by surface irregularities, wrinkles and scratches on the surface of an object (e.g. assembly) that may be generated in the case of hot press rolling, allows an object to be processed to have a small thickness, provides high dimensional precision of an object during processing, and can provide a target product (e.g. electrode assembly) having a large smooth surface depending on the surface of a cold press roll used for press rolling.

In addition, the pressing step may be carried out under a temperature/pressure condition which allows realization of the highest degree of binding force with an object (e.g. porous polymer substrate, porous coating layer and/or electrode) to be in contact with the patterned electrode adhesive layer. The temperature may be about 80-150° C., preferably about 90-110° C., and the pressure may be about 30-200 kgf or about 50-180 kgf. When the patterned electrode adhesive layer is pressed between an electrode and a separator within the above temperature/pressure condition, the resultant electrode assembly shows significantly increased binding force. Such high binding force may contribute to improvement of battery performance and durability as well as maintenance of excellent air permeability of the separator and a small thickness of the electrode adhesive layer. In addition, in the pressing step, a combination of hot press rolling with cold press rolling may be used so that the advantages of hot press rolling and those of cold press rolling may be utilized to the highest degree.

The electrochemical device includes any device which carries out electrochemical reaction, and particular examples thereof include all types of primary batteries, secondary batteries, fuel cells, solar cells or capacitors, such as super capacitor devices. Particularly, among the secondary batteries, lithium secondary batteries, including lithium ion secondary batteries, lithium polymer secondary batteries or lithium ion polymer batteries, are preferred.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Evaluation Methods (1) Air Permeation Time

An air permeability tester (product name: EG01-55-1MR available from Asahi Seiko) was used to determine the time (sec) required for 100 mL of air to pass through a separator under a constant pressure (0.05 MPa). The test was performed at three points, i.e. 1 point at the left side/center/right side of a sample. After the test, the average value was recorded.

(2) Peel Force (Adhesive Strength)

A separator sample obtained from one of Examples and Comparative Examples (e.g. Example 1) was cut into a size of 100 mm (length)×25 mm (width) to prepare two specimens. The two specimens were laminated and subjected to hot pressing at 100° C. for 10 seconds to obtain a laminate. Then, the laminate was fixed to a tester (LLOYD Instrument, LF plus) and the upper separator specimen was peeled off with an angle of 180° and a rate of 100 mm/min at 25° C. The strength at that time was measured.

Example 1

Alumina (AES11 available from Sumitomo Co.) as inorganic particles was mixed with carboxymethyl cellulose (SG-L02 available from GL Chem.) as a dispersing agent at a weight ratio of 99:1 by using water as a solvent, and the resultant mixture was dispersed in a basket mill for 2 hours. The dispersed slurry had a solid content of 40 wt %. Next, 1 part by weight of acrylic copolymer (CSB130 available from Toyo Co.) as a binder was added thereto to obtain slurry for forming an organic/inorganic porous coating layer. The slurry for forming an organic/inorganic porous coating layer was coated on a polyethylene-based porous polymer substrate (ND12 available from Shanghai Energy Co., air permeation time 188 sec/100 cc), followed by drying, to form an organic/inorganic porous coating layer having a thickness of 2 μm on one surface.

Figure 5:
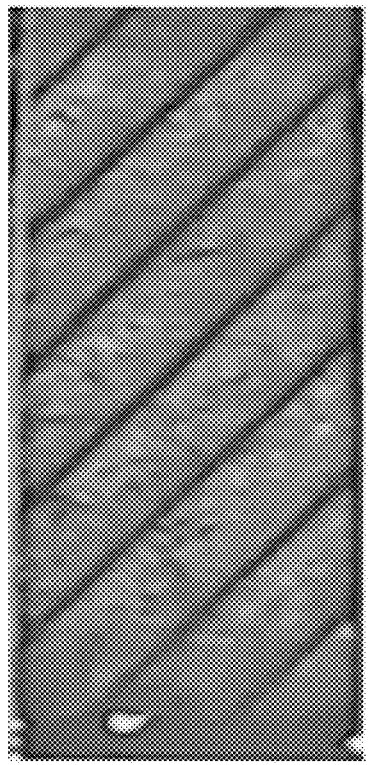
FIG. 5 is a photographic view illustrating the electrode adhesive layer according to Example 1.

Then, polyvinylidene fluoride-co-hexafluoropropylene (PVDF-HFP) (Solef 21510 available from Solvay Co.) as a binder polymer was dissolved in N-methyl pyrrolidone (NMP) as a solvent to prepare a solution having a solid content of 10 wt %, and the solution was applied to the organic/inorganic porous coating layer through microgravure coating in the diagonal direction extending from a long side to a short side to form a patterned electrode adhesive layer. The surface of a roll had surface irregularities so as to form a coated region with a width of 4 mm and a non-coated region with a width of 1 mm. The finally coated region had a width of 4.2 mm and the non-coated region had a width of 0.8 mm due to the spreadability of the binder solution after coating, and the ratio of the coating region was 84% based on the whole surface. Right after coating, the separator was dipped in water for 40 seconds to carry out phase separation, followed by drying, to finish patterned coating layers on both surfaces. The finished separator had a good air permeation time of 215 sec/100 cc. When the separator having an electrode adhesive layer was laminated at 100° C. and subjected to the peel-off test, it showed a preferred peel force of 75.6 gf/mm. The finished separator was used together with a positive electrode based on lithium cobalt oxide (LCO) and a negative electrode based on artificial graphite to manufacture a unit cell through pressing on the whole surface. After manufacturing and peeling the unit cell, the negative electrode surface was observed. As shown in FIG. 5, a trace of patterned adhesive layer can be seen.

Example 2

An electrode adhesive layer was formed in the same manner as Example 1, except that polyvinylidene fluoride-co-tetrafluoroethylene (PVDF-TFE) (VT-475 available from Daikin Co.) as a binder for a binder solution for forming a patterned electrode adhesive layer was prepared at a solid content of 5 wt %. The ratio of the coated region in the electrode adhesive layer was 82%. The separator had a preferred air permeation time of 208 sec/100 cc and a good peel force of 69.4 gf/25 mm. The finished separator was used to manufacture a unit cell in the same manner as Example 1.

Example 3

An electrode adhesive layer was formed in the same manner as Example 1, except that the solvent for a binder solution for forming a patterned electrode adhesive layer was changed into acetone, and the separator was not dipped in water right after coating but was dried out at room temperature under a humidified condition with a relative humidity (RH) of 60%. The ratio of the coated region in the electrode adhesive layer was 89%. The separator had a preferred air permeation time of 221 sec/100 cc and a good peel force of 71.5 gf/25 mm. The finished separator was used to manufacture a unit cell in the same manner as Example 1.

Example 4

An electrode adhesive layer was formed in the same manner as Example 1, except that the solvent for a binder solution for forming a patterned electrode adhesive layer was prepared by mixing 50 vol % of N-methyl-2-pyrrolidone (NMP) as a solvent with 50 vol % of water as a non-solvent, and the step of dipping the separator in water right after coating was not carried out. The ratio of the coated region in the electrode adhesive layer was 83%. The separator had a preferred air permeation time of 217 sec/100 cc and a good peel force of 70.6 gf/25 mm. The finished separator was used to manufacture a unit cell in the same manner as Example 1.

Example 5

An electrode adhesive layer was formed in the same manner as Example 1, except that the organic/inorganic porous coating layer was introduced to both surfaces of the porous polymer substrate. The ratio of the coated region in the electrode adhesive layer was 84%. The separator had a preferred air permeation time of 247 sec/100 cc and a good peel force of 67.6 gf/25 mm. The finished separator was used to manufacture a unit cell in the same manner as Example 1.

Comparative Example 1

Figure 6:
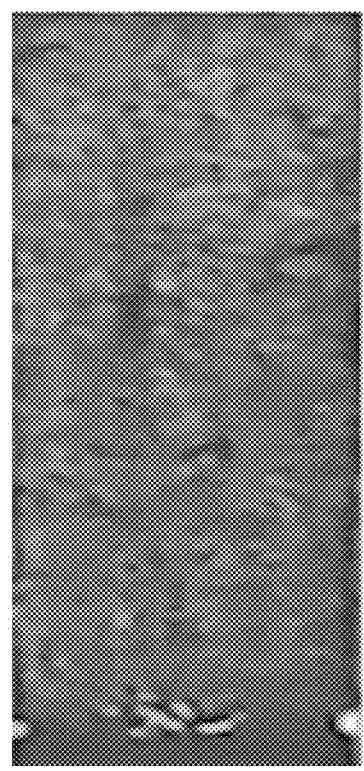
FIG. 6 is a photographic view illustrating the electrode adhesive layer according to Comparative Example 1.

An electrode adhesive layer was formed in the same manner as Example 1, except that the electrode adhesive layer was formed on the whole surface of the organic/inorganic porous coating layer. The separator had a preferred air permeation time of 223 sec/100 cc and a good peel force of 80.5 gf/25 mm. The finished separator was used to manufacture a unit cell in the same manner as Example 1. After the unit cell was manufactured and peeled off, the negative electrode surface was observed. It can be seen from FIG. 6 that a trace of adhesion made on the whole surface.

Comparative Example 2

An electrode adhesive layer was formed and a unit cell was manufactured in the same manner as Comparative Example 1, and a patterned press roll was used to carry out pattern adhesion. The patterned press roll includes a roller section provided on the top or bottom surface of the unit cell and having rotational force, and patterned pressing protrusions provided on the outer circumference of the roller section and partially pressing the top or bottom surface of the unit cell. While adhesion was realized in the region pressed by the patterned press roll, no adhesion was realized in the non-pressed region.

Comparative Example 3

An electrode adhesive layer was formed in the same manner as Example 1, except that the phase separation step was not carried out after coating the electrode adhesive layer. The ratio of the coated region in the electrode adhesive layer was 86%. The separator had a significantly increased air permeation time of 360 sec/100 cc and a decreased peel force of 41.5 gf/25 mm. Such a decreased peel force makes assemblage of a battery impossible due to detachment of an electrode. The finished separator was used to manufacture a unit cell in the same manner as Example 1.

Comparative Example 4

In Example 1, the diagonal line angle was adjusted so that a part of units forming the patterned electrode adhesive layer of the separator might include only the lines starting from the short side of a separator and terminating at the short side. The ratio of the coated region in the electrode adhesive layer was 84%.

Comparative Example 5

An electrode adhesive layer was formed in the same manner as Example 3, except that the binder solution had a solid content of 2.5 wt %. Although a patterned roll was used, the binder solution spread due to its low viscosity, and thus an electrode adhesive layer was formed in the same manner as application on the whole surface.

Test Example: Determination of Electrolyte Wetting Property

Figure 7:
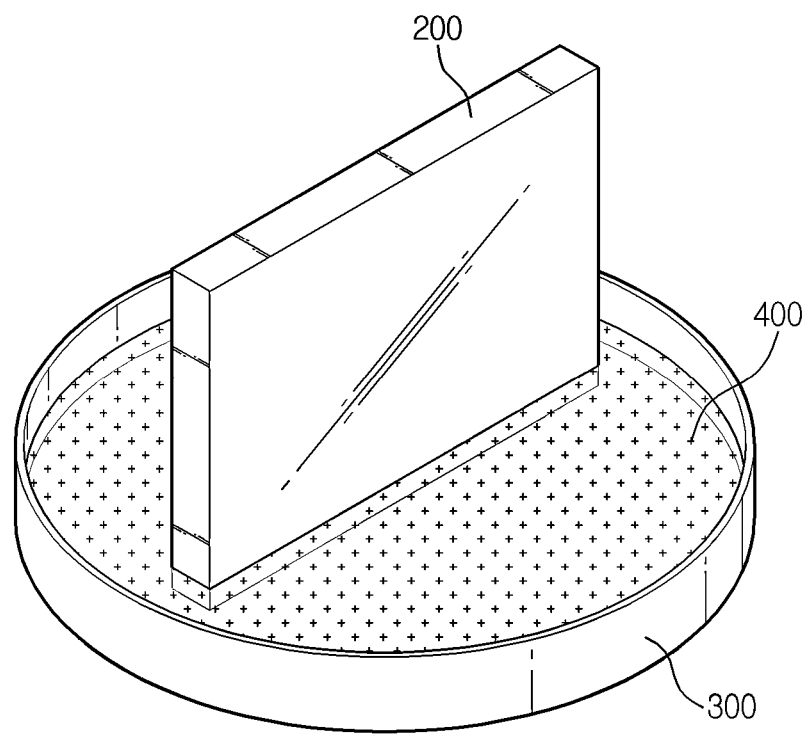
FIG. 7 is a schematic view illustrating an electrolyte impregnation test for an electrode assembly.

Each of the unit cells according to Examples 1-5 and Comparative Examples 1-5 was dipped in an electrolyte (ethylene carbonate (EC): diethyl carbonate (DEC)=3:7, $LiPF_6$ 1.0M) to a depth of about 1 mm from the bottom of the short side so that the long side portion of the unit cell might be immersed therein. Then, the minimum value of height, to which the cell is impregnated with the electrolyte, measured for 10 minutes was determined. FIG. 7 is a schematic view illustrating the impregnation test of an electrode assembly (200), wherein the electrode assembly stands in a erect states in a container filled with an electrolytes. In addition, a lithium secondary battery was finished with a structure including 20 layers of such unit cells stacked successively. The corresponding battery was charged/discharged 50 times under a condition of 1C/1C and its thickness distribution was determined. A non-contact type thickness tester was used to determine whether distortion of the unit cell occurred or not. When the thickness at the end of the unit cell is larger than the thickness at the center thereof by 3% or more, the unit cell was regarded as distorted.

TABLE 1

|  | Electrolyte impregnation height | Distortion |
| --- | --- | --- |
| Example 1 | 15.5 mm | X |
| Example 2 | 16.8 mm | X |
| Example 3 | 15.7 mm | X |
| Example 4 | 16.0 mm | X |
| Example 5 | 18.3 mm | X |
| Comp. Ex. 1 | 2.9 mm | X |
| Comp. Ex. 2 | 3.5 mm | O |
| Comp. Ex. 3 | 17.3 mm | X |
| Comp. Ex. 4 | 8.7 mm | X |
| Comp. Ex. 5 | 3.3 mm | X |

It can be seen from the above results that the electrolyte infiltration rate is significantly improved in the case of a separator having a patterned electrode adhesive layer. In the case of Comparative Example 2, although the electrolyte infiltration rate is improved by using a patterned press roll, distortion occurs after impregnation with the electrolyte due to non-uniform pressure during the lamination step. In the case of Comparative Example 4, even though a patterned adhesive layer is formed, the pattern at the long side, to which the electrolyte is introduced, has a large distance from the center of the cell, thereby providing a short impregnation height.

DESCRIPTION OF DRAWING NUMERALS

100: Separator, 110: Unit, 120: Non-coated portion, 130: Electrode adhesive layer, 140: Porous polymer substrate, 200: Electrode assembly, 400: Electrolyte, 300: Container.

What is claimed is:

1. A separator for an electrochemical device, comprising:
a porous polymer substrate; and
an electrode adhesive layer formed on at least one surface of the porous polymer substrate,
wherein the electrode adhesive layer comprises at least two units containing a binder polymer, and the units are separated from each other by a non-coated portion having no electrode adhesive layer,
the separator has a polygonal shape having at least four sides, the polygon has an internal angle larger than 0° and smaller than 180°, the non-coated portion extends from one side (a first side) to another side (a second side) of the separator in a linear shape having a predetermined width, and the first side and the second side are adjoining each other and are linked to each other by a point,
wherein the separator has a rectangular surface shape having an aspect ratio larger than 1,
the separator comprises at least one linear non-coated portion extending from a long side to a short side of the separator, and
the separator does not include a non-coated portion extending from one long side to the other long side of the separator and a non-coated portion extending from one short side to the other short side of the separator.

2. The separator according to claim 1, wherein the patterned electrode adhesive layer is formed on the separator at a ratio of 70-95% based on a total area of the separator.

3. The separator according to claim 1, wherein the electrode adhesive layer is in a dry state.

4. An electrochemical device comprising a positive electrode, a negative electrode, a separator interposed between the positive electrode and the negative electrode, and an electrolyte, wherein the separator is defined in claim 1.

5. A method for manufacturing the separator for an electrochemical device as defined in claim 1, the method comprising:
mixing a binder polymer resin with an organic solvent to prepare a binder solution;
coating the binder solution on at least one surface of a porous polymer substrate with a predetermined pattern to form a pattern of the binder solution on the surface;
forming micropores on the electrode adhesive layer through phase separation between a solvent and a non-solvent in the coated binder solution; and
forming a patterned electrode adhesive layer on at least one surface of the separator.

6. The method for manufacturing the separator for an electrochemical device according to claim 5, wherein the binder polymer resin is present in an amount of 3-50 wt % based on the weight of the binder solution.

* * * * *